United States Patent [19]

Mohan

[11] Patent Number: 5,247,672
[45] Date of Patent: Sep. 21, 1993

[54] TRANSACTION PROCESSING SYSTEM AND METHOD WITH REDUCED LOCKING

[75] Inventor: Chandrasekaran Mohan, San Jose, Calif.

[73] Assignee: International Business Machines Corporation, Armonk, N.Y.

[21] Appl. No.: 480,700

[22] Filed: Feb. 15, 1990

[51] Int. Cl.[5] .............................................. G06F 7/08
[52] U.S. Cl. ............................ 395/650; 364/DIG. 1; 364/246.8; 364/281.4; 364/222.82
[58] Field of Search .................. 364/DIG. 1, DIG. 2; 395/650

[56] References Cited

U.S. PATENT DOCUMENTS

| | | | |
|---|---|---|---|
| 4,249,241 | 2/1981 | Aberle et al. | 364/200 |
| 4,627,019 | 12/1986 | Ng | 364/900 |
| 4,648,036 | 3/1987 | Gallant | 364/300 |
| 4,698,752 | 10/1987 | Goldstein et al. | 364/200 |
| 4,809,168 | 2/1989 | Hennessy et al. | 364/200 |
| 4,823,310 | 4/1989 | Grand | 364/900 |
| 4,847,754 | 7/1989 | Obermarck et al. | 364/200 |
| 4,914,569 | 4/1990 | Levine et al. | 364/200 |

OTHER PUBLICATIONS

Kung et al., "On Optimistic Methods for Concurrency Control", ACM Trans. on Database Systems, vol. 6, No. 2, pp. 213-226 (Jun. 1981).

Primary Examiner—Gareth D. Shaw
Assistant Examiner—A. Katbab
Attorney, Agent, or Firm—P. A. Garnett; J. C. Pintner

[57] ABSTRACT

Apparatus and method for reading data pages in a transaction processing system without locking the pages are disclosed. The system maintains a Global_Committed_LSN identifying the oldest uncommitted transaction accessing any of the data, and Object_Committed_LSNs identifying the oldest uncommitted transactions accessing particular files, tables and indexes. Each data page includes a Page_LSN identifying the last transaction to have updated the page. To read a page, a transaction first latches the pages, and compares the page's Page_LSN with the Global_Committed_LSN, or with the page's respective Object_Committed_LSN. If the Page_LSN is older than the Committed_LSN with which it was compared, then the transaction reads the page without locking it, since there can be no uncommitted transaction in process which might have updated the page's data. However if the Page_LSN is younger than the Committed_LSN, the page is locked before being read.

16 Claims, 12 Drawing Sheets

INITIALIZE AND MAINTAIN GLOBAL_COMMIT_LSN – FLOWCHART

AT END OF SYSTEM RESTART:

At termination of Normal Processing of an Update Transaction:

INITIALIZE AND MAINTAIN GLOBAL_COMMIT_LSN — FLOWCHART

*FIG. 2*

At End of System Restart:

| | | |
|---|---|---|
| 301 | IF any active transaction exists THEN | /* Any transanctions being restarted? */ |
| 302 | Get Begin_LSNs of Active Transactions from Recovery Manager | /* One or more transactions are being restarted. */ |
| 303 | Global_Commit_LSN := Min(Begin_LSNs of Active Transactions) | /* Begin_LSN of oldest remaining transaction */ |
| 304 | ELSE | /* No active transactions at end of restart */ |
| 305 | Global_Commit_LSN := End_of_Log LSN | /* New transactions' updates will have higher LSNs than End_of_Log_LSN */ |

At Termination of Normal Processing of an Update Transaction:

| | | |
|---|---|---|
| 311 | IF Global_Commit_LSN = Begin_LSN of Terminating Transaction THEN | /* Compute new Global_Committed_-LSN */ |
| 312 | IF any other update transaction is active THEN | |
| 313 | Get Begin_LSNs of Active Transactions from Recovery Manager | |
| 314 | Global_Commit_LSN := Min (Begin_LSNs of Active Update Transactions) | /* Begin_LSN of oldest remaining transaction */ |
| 315 | ELSE | /* Everything is committed. /* |
| 316 | Global_Commit_LSN := End_of_Log_LSN | /* New transactions' LSNs will be higher than End_of_Log_-LSN */ |
| 317 | ELSE | /* Do not change Global_Committed_-LSN */ |
| 318 | Do Nothing | |

INITIALIZE AND MAINTAIN GLOBAL_COMMIT_LSN – PSEUDOCODE

*FIG. 3*

INITIALIZE AND MAINTAIN OBJECT_COMMIT_LSN – FLOWCHART

FIG. 4

| | | |
|---|---|---|
| 501 | Lock higher-level object (e.g., table) in appropriate mode (e.g., IS) | /* Obtain higher-level lock before accessing object */ |
| 502 | Old_Eol := current End_of_Log_LSN | /* Save current End_of_Log_LSN */ |
| 503 | IF there are active update transactions accessing the page THEN | |
| 504 |     Get Begin_LSNs of active update transactions accessing object from Recovery Manager | |
| 505 |     Min_Begin_LSN := MIN(Begin_LSNs of active update transactions) | |
| 506 | ELSE | |
| 507 |     Min_Begin_LSN := 'infinity' | /* Highest possible value */ |
| 508 | Object_Commit_LSN := Minimum(Old_Eol,Min_Begin_LSN) | /* Computed Object_Committed LSN */ |

INITIALIZE AND MAINTAIN OBJECT_COMMIT_LSN – PSEUDOCODE

*FIG. 5*

READ PAGE USING COMMIT_LSN – FLOWCHART

FIG. 6

701 Fix page to be read in buffer pool        /* Insure that page
                                               stays in buffer
                                               pool */

702 Buffaddr := Address of page in
    buffer pool
703 Latch page at Buffaddr in 'S' mode        /* Latch fixed page
                                               in S mode */

704 IF Object_Commit_LSN exists for page
    at Buffaddr THEN
705        Committed_LSN := Object_-          /* Use page's
           Committed_LSN for page at          Object_committed_LSN,
           Buffaddr                           since it exists */
706 ELSE                                      /* There is no
                                               Object_Committed_LSN
                                               for the page */
707        Get Global_Committed_LSN           /* Get Global_-
                                               Committed_LSN from
                                               recovery manager or
                                               shared storage */

708        Committed_LSN := Global_-
           Committed_LSN
709 IF Buffaddr's Page_LSN >=                 /* Some of the page's
    Committed_LSN THEN                        data may be
                                               uncommitted /*
710        Lock page                          /* Lock the page to
                                               insure it is
                                               committed */
711 ELSE                                      /* No lock needed */
712        Do Nothing
713 read page's data
714 Unlock page if previously locked
715 Release latch on page

READ PAGE USING COMMIT_LSN — PSEUDOCODE

*FIG. 7*

OBTAIN LATCH − FLOWCHART

FIG. 8A

OBTAIN LATCH — FLOWCHART

*FIG 8B*

901 Fix page to be read in buffer pool   /* Insure that page stays in buffer pool */

902 Read latch control block (Old_LCB) for page to be latched
903 Existing_Mode = 'Held' value from Old_LCB   /* Existing latches (if any) on page */
904 Existing_Holder = 'Holder' value from Old_LCB
905 Desired_Mode = Desired latch mode ('S' or 'X')   /* Latch desired by transaction */
906 Desired_Holder := Requesting transaction 907 IF Existing_Mode = 'Held' THEN   /* One or more latches are currently held on the page */
908     IF no existing waiters for latch THEN   /* No other transactions waiting for the latch */
909         IF Desired_Mode is compatible with current Existing_Mode THEN
910             GOTO line 915   /* Shared latch is granted */
911         ELSE
912             Create list of waiting transactions, using CDS IF still no waiters
913         Add Desired_Mode and Desired_Holder to wait list using CDS IF wait list has not changed
914         Wait until latch can be granted   /* Existing latch holders will notify waiting transaction*/

915 MOVE Desired Mode and Desired_Holder INTO Existing_Mode and Existing_Holder list using CDS   /* Latch is granted */

OBTAIN LATCH — PSEUDOCODE

*FIG. 9*

Symbols used:
{ — Begin Transaction Log Record
} — End Transaction Log Record
P1, P2, ... — Log Records of File P's Pages
S1, S2, ... — Log Records of File S's Pages

RECOVERY LOG WITH COMMIT_LSN

FIG. 10

Transaction Table:

| Tran ID | Begin_LSN |
|---------|-----------|
| T2      | 40        |
| T3      | 100       |

Global_Committed_LSN:

36 — | 40 |

Object_Committed_LSN Table:

38 —

| Object | Committed_LSN |
|--------|---------------|
| 38a — S | 40 |
| 38b — P | 100 |

TRANSACTION TABLE AND COMMIT_LSNs

FIG. 11

TRANSACTION PROCESSING SYSTEM AND METHOD WITH REDUCED LOCKING

BACKGROUND OF THE INVENTION

1. Technical Field

This invention relates to computerized transaction processing systems. More particularly, it relates to a method for reducing locking by transactions which are executing concurrently.

2. Description of the Prior Art

Transaction Processing

A transaction comprises a sequence of operations that changes recoverable data such as a database from one consistent state into another. A transaction processing system guarantees that if a transaction executes some updates against recoverable data, and if a failure occurs before the transaction reaches its normal termination or an interim point of consistency, then those updates will be undone. When a new point of consistency has been reached and all updates made by the transaction must be made permanent, the transaction is committed.

To fulfill this transaction recovery guarantee, the system must be able to remember across system outages both transactions in progress and their update actions, so that their effect on recoverable data can be properly reflected when the system is restarted. The system maintains a log of each transaction's progress and changes to data in order to fulfill the transaction recovery guarantee. The log data, known as log records, can be examined to ensure that either the transaction's committed actions are reflected in the data base or were undone. When the log records include actual data, they can also be used to reconstruct data which has been damaged or lost, such as by the failure of a storage device. The log can be thought of as an ever growing sequential file.

The log is permanently stored on stable storage such as a disk file (often called a "disk drive"), which remains intact and available across system failures. Log records are first written to temporary, volatile log file buffers in the computer's memory, and then transferred to stable storage at certain times (e.g., when a transaction is committed).

Locking

Both stable storage (e.g., disk storage) and virtual storage (e.g., computer memory) are divided into pages. Each page typically holds the equivalent of several typewritten pages. The page may be subdivided into records, such as the names and addresses of individuals. When a transaction needs to access certain data, the page containing that data is copied from stable storage into a buffer of the same size in virtual storage. If the data is updated by the transaction the updated page is transferred back to stable storage at a later time.

Locking is used to control simultaneously executing (i.e. concurrent) transactions' access to shared data, and in particular is used to prevent concurrent transactions from inconsistently modifying the same data. Appropriate use of locking can guarantee a transaction that the data that it reads is in a consistent state and that the data does not contain uncommitted updates of other transactions.

Systems which use page-level locking cannot lock less than a whole page, even if the transaction obtaining the lock only needs to access one of the records on the page. Locking at a finer granularity, such as record-level locking can reduce contention between concurrent transactions, but imposes greater processing overhead.

Locking is time consuming ("expensive" in technical terms), and therefore slows the processing of transactions. Storage for individual locks' information must be acquired, formatted and released, and machine instructions must be executed to acquire and release locks. In one transaction processing system, acquiring a lock and releasing it requires about 800 instructions even when there are no conflicts with other locks or requests.

Lock managers typically process lock requests in a first-in-first-out (FIFO) basis in order to fairly allocate locks among competing transactions. As a result, sometimes a transaction must wait for a lock even though its requested lock can be granted, because its request is not compatible with an intervening request from another transaction.

Record-level and similar fine-granularity locking can be helpful in increasing concurrency by reducing contention among transactions. It is well known in the art that locking granularity affects system throughput. Typically, finer-granularity of locking leads to higher throughput. The drawback of fine-granularity locking is that for those transactions that access large number of records, the number of locks that need to be acquired may increase dramatically.

In many cases the sole purpose of locking is to ensure that a given piece of data that is about to be read is in the committed state, rather than to delay future updates. Ad hoc queries that examine large volumes of data and that generally do not perform any updates of the examined data are examples of locking to ensure that data is committed. In these situations, known prior art techniques either do not apply or are too time consuming (in terms of machine instructions).

There is a significant body of prior art relating to locking reduction. Ng, U.S. Pat. No. 4,627,019, "Database Management System for Controlling Concurrent Access to a Database", and Gallant, U.S. Pat. No. 4,648,036, "Method for Controlling Query and Update Processing in a Database System", disclose methods in which multiple versions of the data are maintained to avoid locking by read-only transactions. Ng discloses storing an array of access blocks, each block defining the database location of a version of the data, with only one version being current. However versioning does not avoid locking for transactions which need completely current data. Versioning only helps transactions which perform no updates and which do not mind reading outdated data. Further, versioning requires extra storage to maintain the multiple versions of updated data objects. Goldstein et al., U.S. Pat. No. 4,698,752, avoids relocking records by maintaining a transaction list identifying locked records which were previously locked by the same. transaction.

Instead of avoiding locking, Kung and Robinson, "On Optimistic Methods for Concurrency Control", ACM Transactions on Database Systems, vol. 6, no. 2, pp. 213-226 (June 1981), propose an approach called "optimistic locking" for reducing the cost of locking.

There is a need for a transaction processing system which does not require transactions to obtain unnecessary locks. There is also a need for a method for more efficiently determining that a piece of data is in the committed state. Finally, there is a need to support fine-granularity locking in a way that is not too time consuming for transactions reading large quantities of data.

SUMMARY OF THE INVENTION

This invention comprises an improved method of accessing a selected one of the data units by a selected one of two or more processes in a computerized data processing system. The system includes two or more data units (such as data pages), each identified by an identifier (such as a log sequence number) which reflects an age not older than the age of the last modifcation of the data unit. First, a second identifier is maintained so as to reflect the age of the then-oldest in-process modification of some or all of the data units. When a selected page is to be accessed, this second identifier is compared with the selected page's identifier. Next, access to the selected page is obtained compatibly with other process' accesses to it. This is done using fewer computer instructions if the selected page's identifier is older than the second identifier than if the selected page's identifier is younger than the second identifier. Once access is obtained, the selected page is read.

The invention also comprises a data processing system comprising means for maintaining such a second identifier, means for comparing it to the selected page's identifier, means for obtaining access to the selected page using fewer computer instructions if the selected page's identifier is older than the second identifier than if the selected page's identifier is younger than the second identifier, and means for reading the page.

The invention also comprises a computer program recorded on magnetic or like media for use in such a data processing system.

Other features and advantages of this invention will become apparent from the following detailed description of the presently preferred embodiments of the invention, taken in conjunction with the accompanying drawings.

BRIEF DESCRIPTION OF THE DRAWINGS

FIG. 1, consisting of 1A and 1B, is a block diagram of a transaction processing system according to this invention, showing particularly the buffer pool and recovery log used by the invention.

FIG. 8, consisting of 8A and 8B, is a flowchart of the preferred method for obtaining a latch on a page.

DETAILED DESCRIPTION OF THE PREFERRED EMBODIMENTS

Overview

Figure 1A:
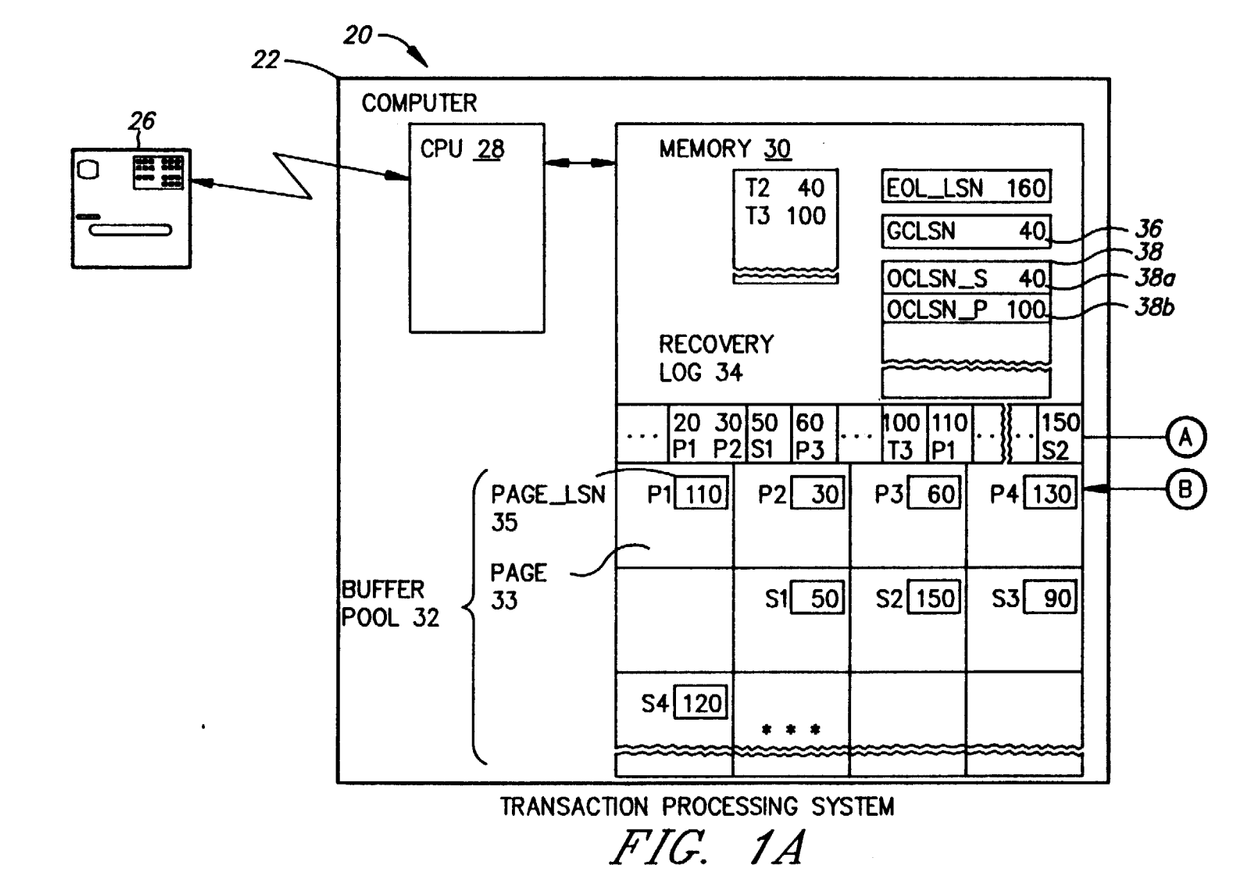
Figure 1B:
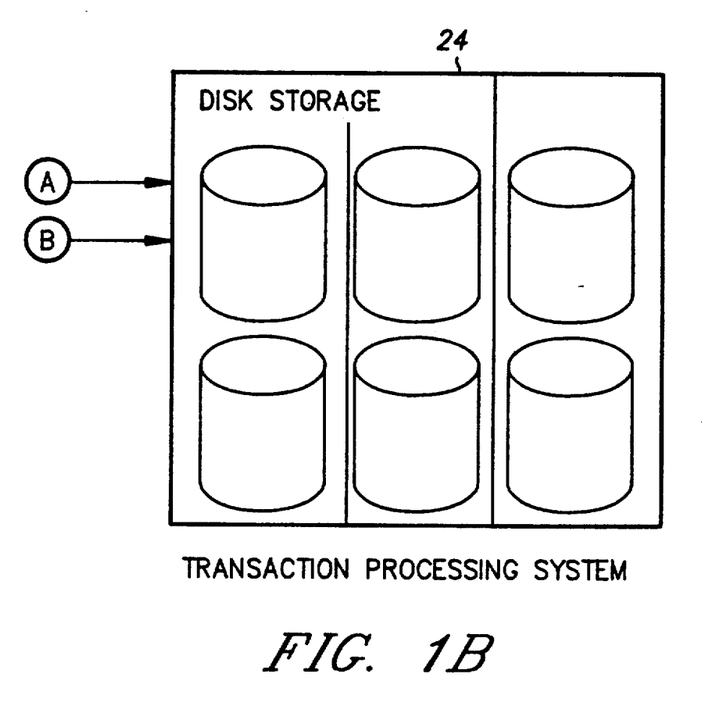

As shown in FIG. 1, a transaction processing system 20 according to this invention comprises a computer 22 and associated disk storage 24. The computer communicates with one or more devices such as an automated teller machine (ATM) 26 for submitting transactions to the system. The computer 22 is a general purpose programmable digital computer such an IBM[1] Model 3090, and includes a central processing unit (CPU) 28 for executing program instructions, and volatile memory 30. Data is retained in the memory 30 only until it is no longer needed, or until a system shutdown erases the memory. Data is stored permanently on the stable disk storage 24, and transferred into the memory 30 when it is needed to be read or updated.

[1] IBM is a trademark of International Business Machines Corporation.

The disk storage 24 is a general purpose direct access storage device such as an IBM Model 3390 Disk Storage Device. The disk 24 is divided into pages. As data on a particular page is needed for a transaction, that page is transferred into a corresponding page 33 of a buffer pool 32 in the memory 30. Once in the buffer pool 32, a page's data can be read or updated by the CPU 28 as needed for a transaction. Updated pages are transferred back from the buffer pool 32 to the disk storage 24, permanently saving the updated information. However, if the system 20 loses power or otherwise fails before an updated page is transferred back to disk storage, information on that page may be lost.

A recovery log 34 is maintained in the memory 30 and on the disk storage 24 in order to recover from system failures. The recovery log records page updates and other events of interest, and associates a log sequence number or LSN with each recorded event. In the method of recovery logging known as "write-ahead logging", a log record of a page update is written to the recovery log 34 on the disk 24 before the page itself is updated on the disk, thereby ensuring that the update can be undone if the transaction needs to be aborted after the updated page is written to disk. The page in the buffer pool is assigned a Page_LSN 35 which equals the log sequence number (LSN) assigned to that page update's log record. When the updated page is transferred from the buffer pool 32 back to the disk storage 24, the Page_LSN 35 is transferred with it. Then, during recovery the recovery manager need only search the recovery log back to the page's log sequence number for updates to be recovered.

The system 20 insures that only committed data is made available to transactions (unless of course the uncommitted data belongs to the accessing transaction). In prior art transaction processing systems, a transaction wishing to merely read data on a page is required to obtain a lock on that page in order to insure that it reads only committed data on the page, and that no concurrently executing transaction will update the page's data while it is being read. Obtaining these locks can significantly slow long read-only transactions which are required to lock each page to be read.

This invention uses fast, short duration latches on pages to be read, and then locks the pages only if they might contain uncommitted data. Obtaining such latches on pages is as much as ten times faster than obtaining locks. This allows transactions to complete significantly faster where most of the data being accessed has been committed.

The system 20 maintains in the memory 30 a transaction table of the log sequence numbers (LSN) of the oldest uncommitted transactions still accessing the data. A Global_Committed_LSN 36 identifies the oldest uncommitted transaction accessing any of the data. Object_Committed_LSNs (OCLSNs) 38a,38b identify the oldest uncommitted transactions that modified particular subsets of the data (such as files, tables and indexes).

When a transaction prepares to access a page in the buffer pool 32, it first latches the page and then compares that page's Page_LSN 35 with the Global_Committed_LSN 36, or with the Object_Committed_LSN 38a,38b for the object containing the page to be read if such an Object_Committed_LSN exists. If the Page_LSN 35 is older than the Committed_LSN with which is was compared, then the system can be sure that there is no uncommitted transaction in process which has updated the page's data. Knowing this, the page may be read immediately, without locking it against conflict with update transactions. Once the page has been read, the latch is immediately released to allow other transactions to access the page.

If the comparison shows that the Page_LSN 35 is not older than the Committed_LSN tested, then it is possible that an uncommitted transaction might have updated the page's data. In this case a lock must be obtained by the transaction before the page can be accessed. However, this happens only rarely in large database systems where only a small fraction of the data is being updated at any time. The majority of transactions may be processed much more rapidly than in prior art systems, since full scale lock resolution is not needed.

Log Sequence Numbers

Each log record is assigned a unique log sequence number (LSN) at the time the record is written to the recovery log 34. The LSNs are assigned in ascending sequence. The LSNs are the logical addresses of the corresponding log records, although version numbers or timestamps may also used. When a transaction begins, it places an initial log record on the recovery log 34, and this record is assigned a LSN known as the transaction's Begin_LSN. On finishing the logging of an update to a page 33, the LSN of the log record corresponding to the latest update to the page is placed in a field 35 in the page header. Hence, knowing the Page_LSN 35 allows the system to correlate the contents of the page 33 with the logged updates relating to that page. During recovery the Page_LSN 35 and the log record's LSN can be compared to determine whether or not that log record's update is already reflected in that page 33.

The crucial fact that makes the invention accomplish its objectives is that no page 33 with a Page_LSN 35 that is less than the LSN of the first log record of the oldest update transaction still executing can have any uncommitted data.

Locking

As described above, locks may be obtained at different granularities such as record (tuple, row), table (relation) and file (tablespace, segment, dbspace). And at each granularity, locks may be obtained in different lock modes such as S (Shared), X (eXclusive), IX (Intention eXclusive), IS (Intention Shared), and SIX (Shared Intention eXclusive). S and X locks are most common. An S lock permits the transaction to read the locked data, while an X lock permits the transaction to both read and update the data.

Locks on a given object can be held simultaneously by different transactions only if those locks' modes are compatible. X is compatible with none of the modes. S is compatible with S and IS only. IX is compatible with IX and IS only. IS is compatible with IX, IS, S, and SIX only. SIX is compatible with IS only. Intention locks (IX, IS, and SIX) are obtained on the higher levels of the data object hierarchy (e.g., file and table), and S and X locks are obtained on the lower level objects (e.g., record) to be accessed. The nonintention mode locks (S or X), when obtained on an object at a certain level of the data object hierarchy, implicitly grant locks of the corresponding mode on the lower level objects of that higher level object. The intention mode locks, on the other hand, only give the privilege of requesting the corresponding nonintention mode locks on the lower level objects (e.g., SIX on a table implicitly grants S on all the records of that table, and it allows X to be requested explicitly on the records).

Lock requests may be made conditionally or unconditionally. A conditional request means that the requester is not willing to wait if the lock is not grantable immediately at the time the request is processed. An unconditional request means that the requestor is willing to wait until the lock becomes grantable.

Locks may be held for different durations. An unconditional request for an instant duration lock means that the lock is not to be actually granted, but the lock manager has to delay returning the lock call with the success status until the lock becomes grantable. Manual duration locks are released some time after they are acquired, typically long before the transaction terminates. Commit duration locks are released only at the time of termination of the transaction, i.e., after commit or abort is completed.

The lock manager chains together all the locks acquired by a transaction. When the transaction terminates, all the commit and manual duration locks still held are released via a single call to the lock manager.

All transactions are assumed to get at least an intention lock (e.g., in the IS mode) on the higher level object (e.g., the table) which they wish to access. Even when the page is the smallest granularity of locking, an exclusive (X) latch is used by update transactions to let other nonlocking transactions (i.e., readers of the page) know that an update is in progress. This permits uncommitted data to be read, when desired, with physical consistency of the data and the validity of pointers being guaranteed by making such transactions acquire a share (S) mode latch before examining a page. With finer than page locking, all updaters and readers are in any case required to do latching in the appropriate mode before examining the page.

Maintaining the Global_Committed_LSN 36

An update transaction writes a Begin_UR (UR means "unit of recovery") record just before performing its first update. Read-only transactions do not do any logging. The LSN of the Begin_UR log record is termed the Begin_LSN of the transaction. Typically, in transaction systems, a component of the system called the recovery manager or the transaction manager maintains a transaction table which contains one entry for each active transaction. The entry associated with an update transaction stores that transaction's Begin_LSN. These Begin_LSNs are used to compute the Global_Committed_LSN 36 and Object_Committed_LSNs 38a, 38b.

Figure 2:
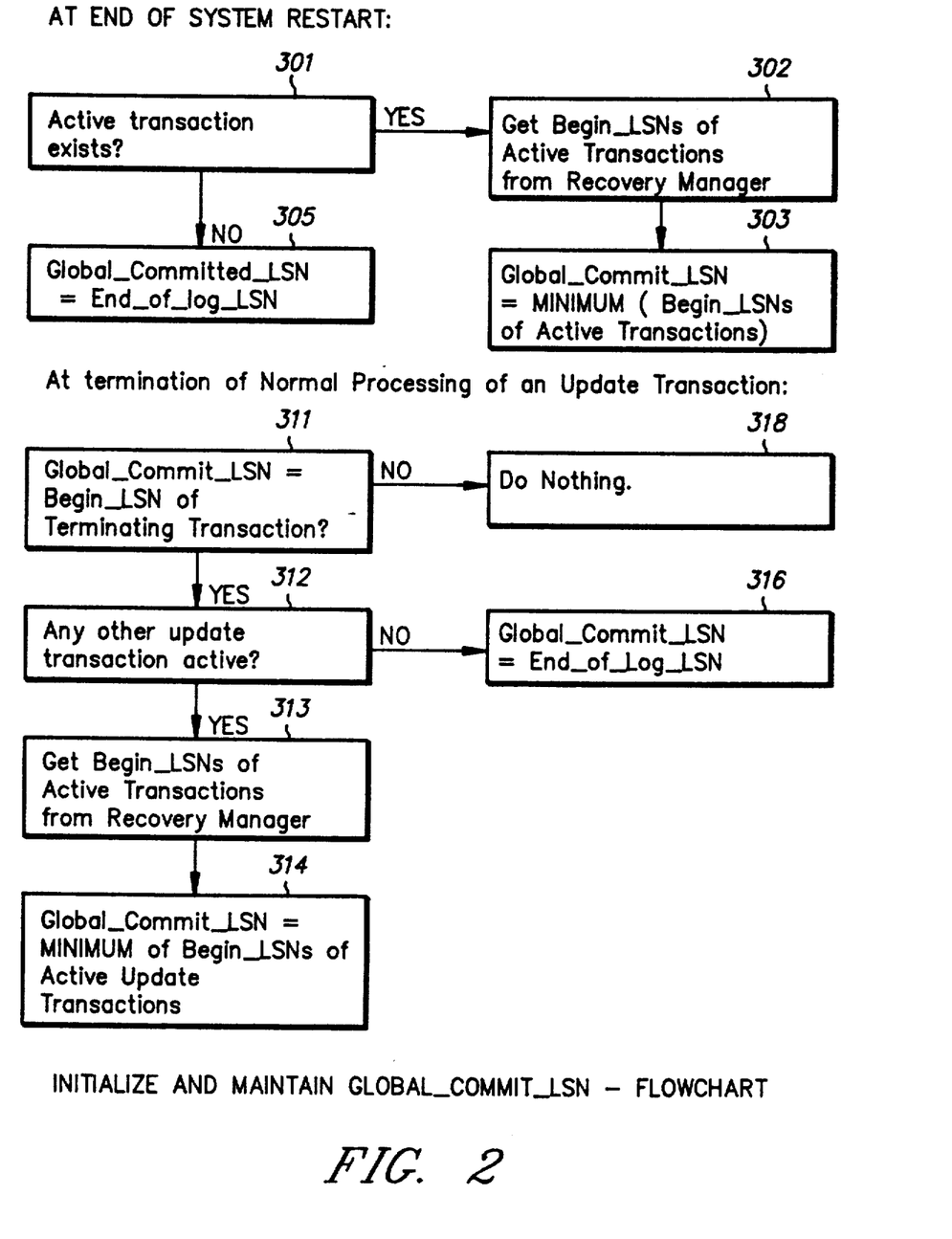
FIG. 2 is a flowchart of the preferred method for initializing and maintaining a Global_Committed_LSN.
Figure 3:
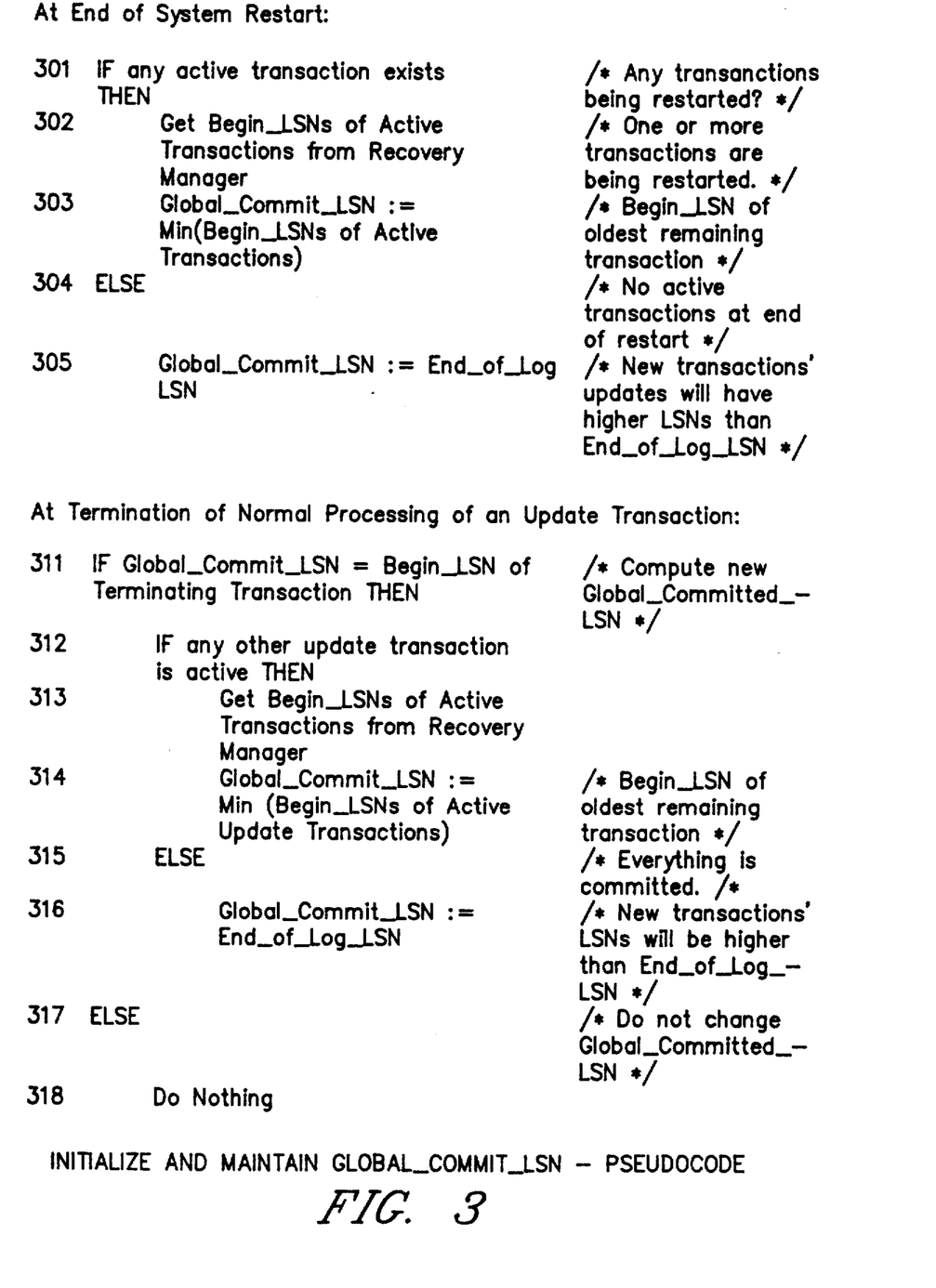
FIG. 3 is pseudocode corresponding to the flowchart of FIG. 2.

FIGS. 2 and 3 show the preferred method for maintaining the Global_Committed_LSN 36. The description which follows references the pseudocode in FIG. 3. However, the flowchart of FIG. 2 corresponds closely to the pseudocode, and reference numerals in FIG. 2 correspond to pseudocode line numbers of FIG. 3.

The Global_Committed_LSN 36 must be calculated whenever the system restarts, as well as during normal processing of update transactions. Lines 301-305 calculate the Global_Committed_LSN 36 at system restart. If on completion of system restart there is an active transaction (line 301), then the Begin_LSN of all the active transactions is obtained from the system's recovery manager (line 302). The Global_Committed_LSN 36 is equal to the minimum, i.e., the lowest or oldest value, of the Begin_LSNs of the restarted active transactions (line 303).

If there are no active transactions at system restart (line 304), then the Global_Committed_LSN 36 is simply equal to the recovery log's End_of_Log_LSN (line 305). Every transaction commenced after system restart will have a Begin_LSN higher (i.e., younger) than the End_of_Log_LSN stored as the Global_Committed_LSN 36 at restart.

Whenever an update transaction terminates, the Global_Committed_LSN 36 must be checked, and if necessary recomputed. However the recomputation must only be done if the terminating transaction is the oldest transaction then executing, i.e., if its Begin_LSN is the one which determined the then existing Global_Committed_LSN 36. If this is true (line 311), then if there are other active update transactions (line 312) the Global_Committed_LSN 36 is computed as the minimum (i.e., the oldest) of the Begin_LSNs of the remaining active update transactions (lines 313-314). If there are no other active update transactions (line 315), then the Global_Committed_LSN 36 is set equal to the End_of_Log_LSN, the current log sequence number of the recovery log 34.

The Global_Committed_LSN 36 is preferably kept in shared storage and modified by the recovery manager using Compare & Double Swap logic. In this way transactions which need to know the value of the Global_Committed_LSN 36 can obtain it directly from the recovery manager's shared storage.

The Global_Committed_LSN 36 guarantees that all updates logged prior to that point in the log have already been committed. It is possible that some additional updates logged after the Global_Committed_LSN will have also been committed. If the transaction wishes to determine which of those later updates (i.e., updates with LSNs greater than or equal to the Global_Committed_LSN) have been committed, additional processing will be required.

Maintaining the Object_Committed_LSNs 38a, 38b

Instead of having one Global_Committed_LSN 36, transactions can benefit further by computing a specific Object_Committed_LSN 38a, 38b for the object to be accessed. In this way, a long-running update transaction that accesses some other objects and keeps the Global_Committed_LSN 36 quite a bit in the past will not unduly restrict the applicability of this invention to particular data objects of interest.

Figure 4:
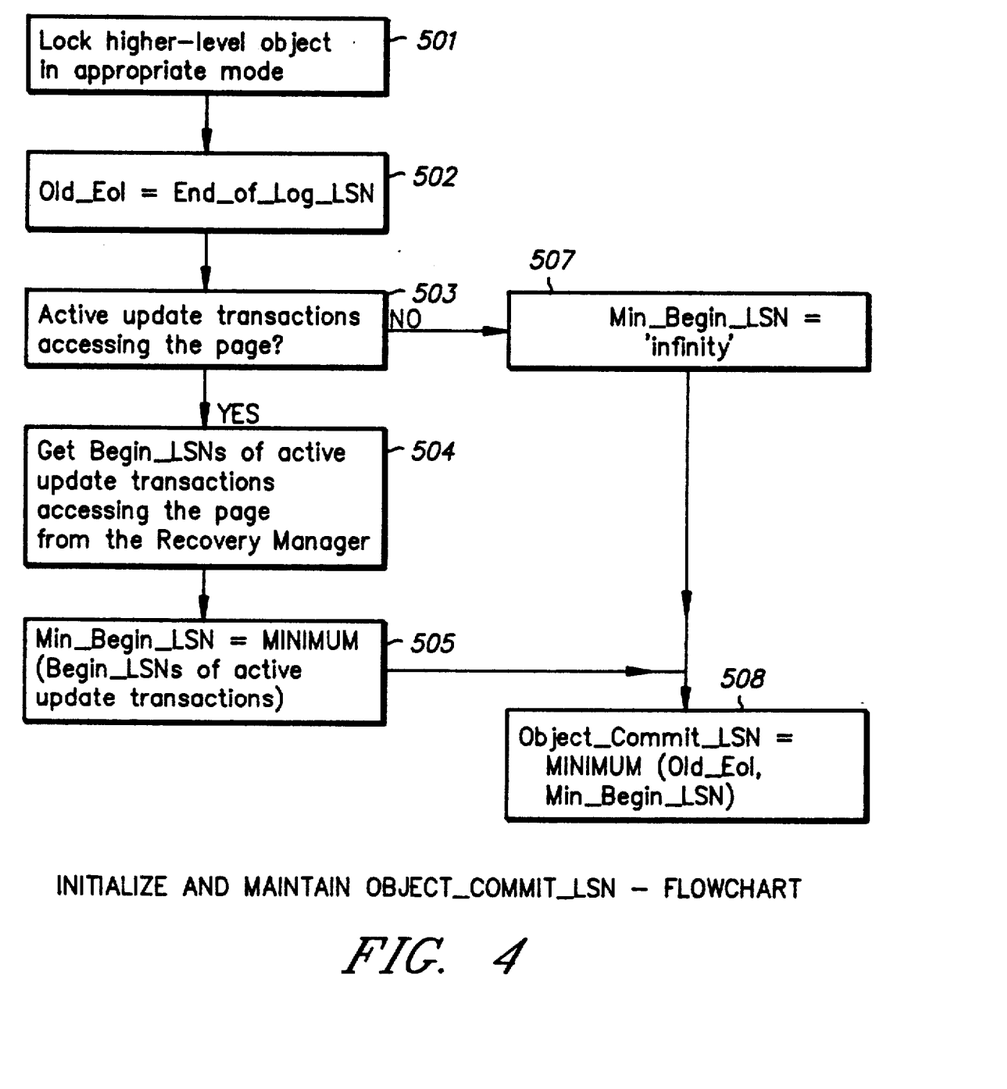
FIG. 4 is a flowchart of the preferred method for initializing and maintaining an Object_Committed_LSN.
Figure 5:
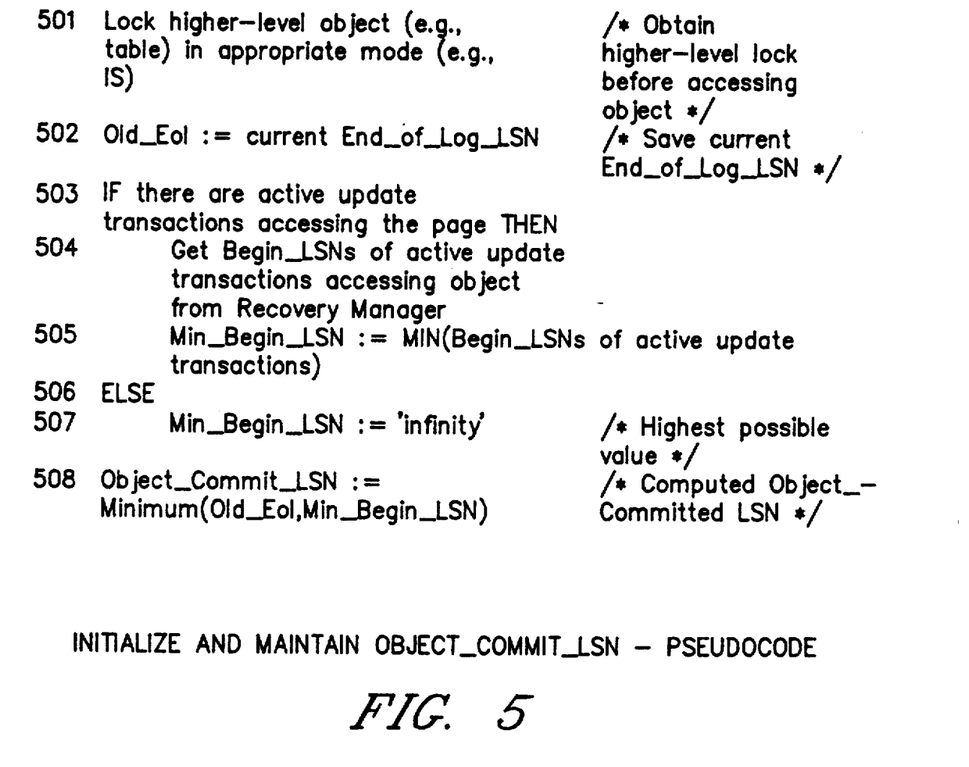
FIG. 5 is pseudocode corresponding to the flowchart of FIG. 4.

The preferred method for maintaining such an Object_Committed_LSN 38a, 38b is shown in FIGS. 4 and 5. As with FIGS. 2 and 3, reference numerals for the flowchart of FIG. 4 correspond to the pseudocode line numbers of FIG. 5.

A higher level lock on the object for which the Object_Committed_LSN 38a, 38b is to be computed must be obtained as the first step. This is typically done using an IS lock on the higher level object (line 501). Then, the current End_of_Log_LSN is stored to prevent new transactions updating the object from distorting the calculated Object_Committed_LSN 38a, 38b.

If there are active update transactions accessing the object for which the Object_Committed_LSN 38a, 38b is being calculated (line 503), then their Begin_LSNs are obtained from the recovery manager (line 504) and the minimum (i.e., the oldest) Begin_LSN is calculated (line 505). Otherwise, if there are no updates in process for the object, the value of 'infinity' is stored (line 507).

The Object_Committed_LSN 38a, 38b is calculated as the minimum (i.e., the older) of the stored current End_of_Log_LSN, and the Begin_LSN of the object's active update transactions. If there are no such active transactions, the Object_Committed_LSN 38a, 38b is thus set to the End_of_Log_LSN of the recovery log 34.

Latching

Traditionally, locks are used to determine whether a data page 33 that needs to be accessed by a transaction is currently in the committed state or not. By latching a particular page and comparing its Page_LSN 35 to a Committed_LSN of this invention a transaction can determine, without locking, whether that particular page to be accessed is in fact committed. If the page is committed, the transaction can immediately access its data and release the latch.

Typically, latches are used to guarantee physical consistency of data, while locks are used to assure logical consistency of data. The deadlock detector is not informed about latch waits, so latches must be requested so as to avoid deadlocks involving latches alone, or involving latches and locks. Latches are usually held for a much shorter period of time than are locks.

Basically, locks and latches are implemented the same way (e.g., by using the IBM/370 compare and swap type instructions). The major difference comes in the way storage management is done for them. Space for the data structures representing latches is allocated statically since the number of latches is significantly fewer than the number of lockable objects in the data base. As a result, the data structure for a given latch is directly addressable (e.g., for page latches, the latch data structure is part of the buffer control block describing the buffer version of the page).

Acquiring a latch is cheaper than acquiring a lock (in the no-conflict case, 10s of instructions versus 100s of instructions), because the latch control information is always in virtual memory in a fixed place, and direct addressability to the latch information is possible given the latch name. Since each transaction holds at most 2 or 3 latches simultaneously, the latch request blocks can be permanently allocated to each transaction and initialized with transaction ID, etc. right at the start of that transaction, rather than being allocated dynamically. This minimizes the overhead associated with obtaining a latch. In contrast, lock request blocks cannot reasonably be permanently allocated, and must be dynamically allocated, since the number of locks held simultaneously by different transactions may vary widely. It is for these reasons that latching is much faster than locking.

Latches can be obtained in S and X modes, can be conditional, and can have varying duration (except that commit duration is not allowed). These options have the same meanings as they do for the full-scale locks described above.

Figure 8A:
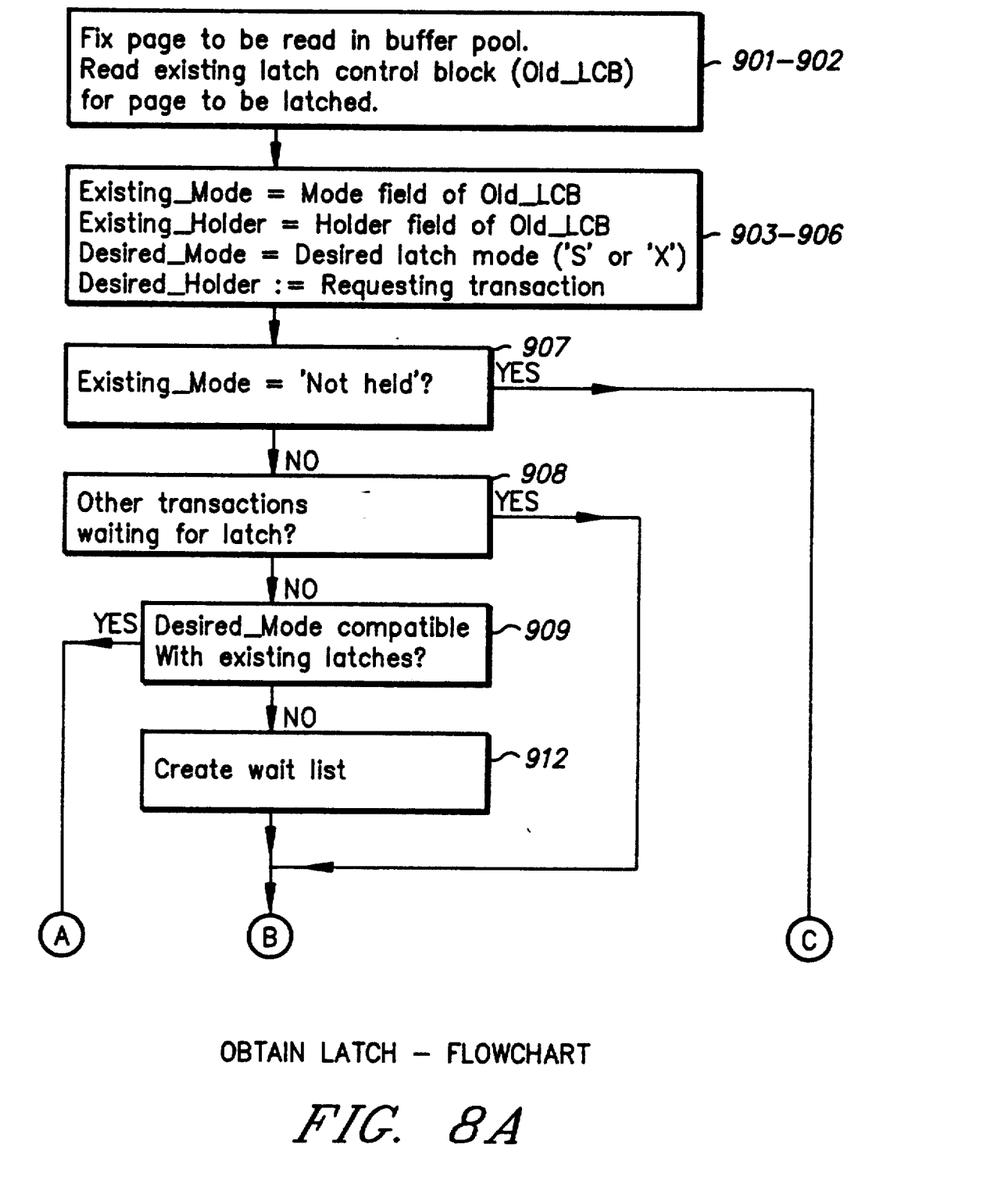
Figure 8B:
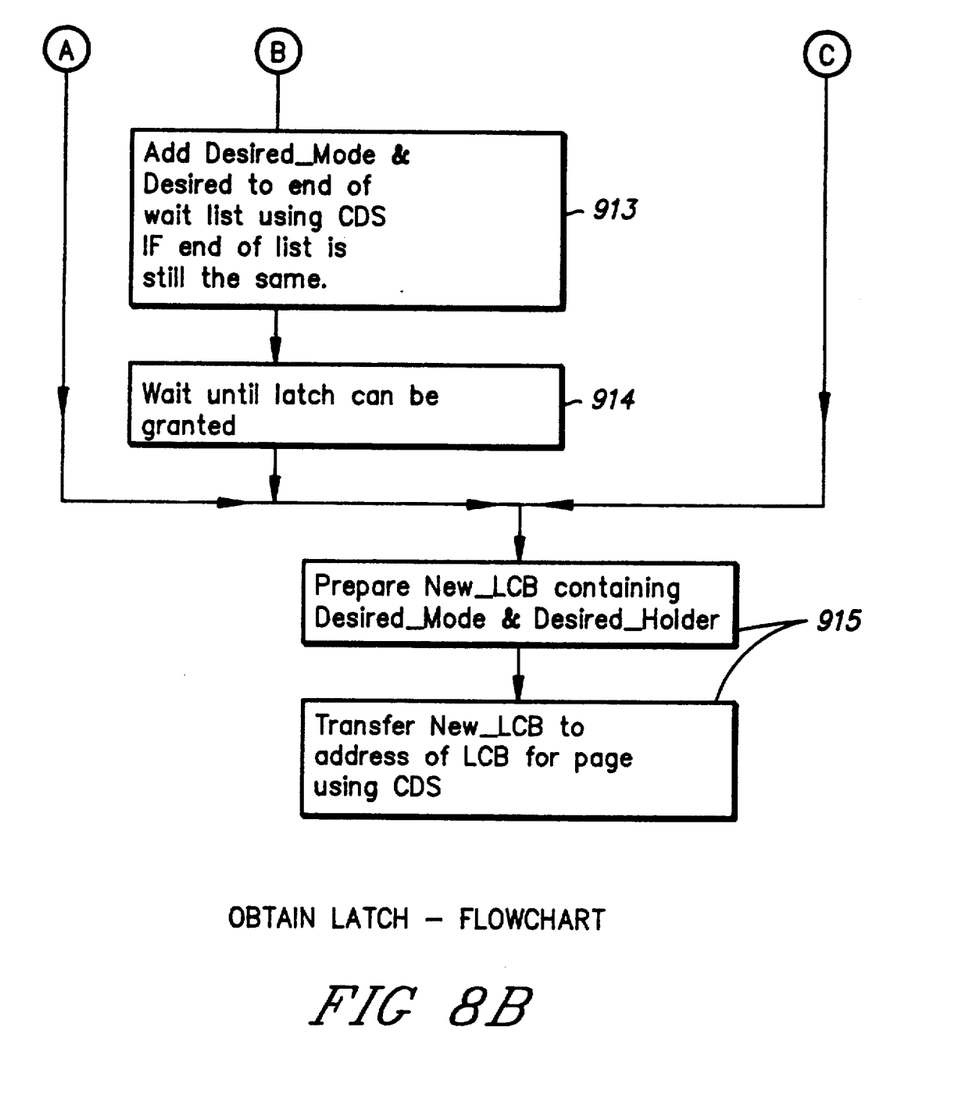
Figure 9:
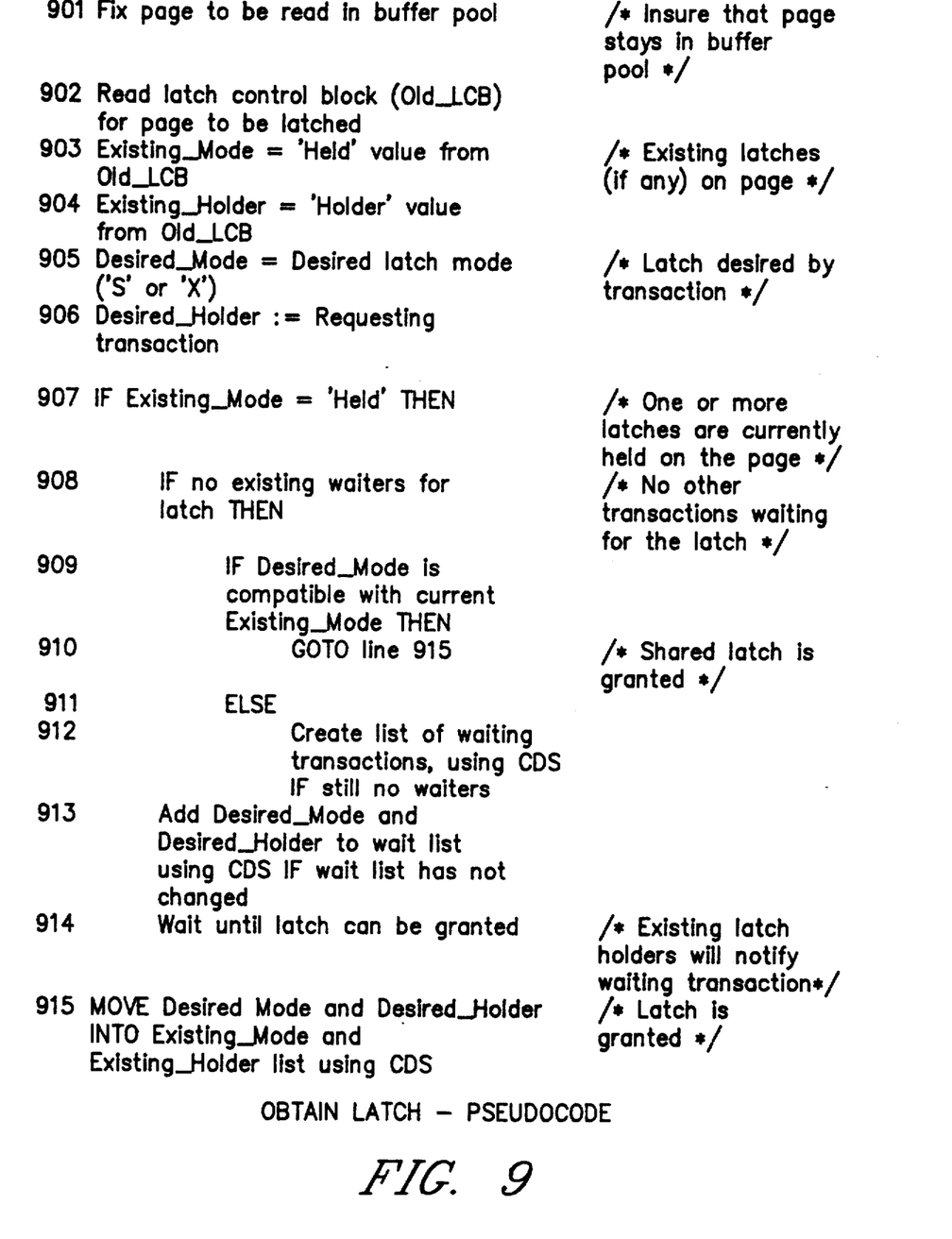
FIG. 9 is pseudocode corresponding to the flowchart of FIG. 8.

The preferred method for obtaining a latch on a data page as used in this invention is shown in FIGS. 8 and 9, in which reference numerals for the flow chart of FIG. 8 correspond to the pseudocode line numbers of FIG. 9.

When a transaction wishes to latch a page, it must first fix the page in the buffer pool (line 901) and read the latch control block for that page (line 902).

If another transaction already holds a latch on the page, the "Existing_Mode" field of the latch control block will equal the value 'Held' (line 907). If this is not the case, the latch can be granted immediately (line 915).

If one or more latches are currently held on the page by other transactions, then the requesting transaction must first check to see whether other transactions besides the current latch holder are waiting for their own latches (line 908). If there are such waiting transactions, then the requesting transaction adds itself to the list of waiting transactions (line 913).

If there are no other transactions waiting for latches on the page, then if the latch which the requesting transaction desires is compatible with the latch currently held on the page (line 909), then the requesting transaction's latch can be granted immediately (line 915).

If the requesting transaction's desired latch is not compatible with the existing latch on the page, and there are no other waiting transactions, then the requesting transaction must create a list of waiting transactions (line 912), with itself as the first and only entry on the list (line 913).

Once the requesting transaction has added itself to the list of waiting transactions, it must wait until its requested latch can be granted (line 914). Waiting transactions are notified by existing latch holders when the latches for which they are waiting can be granted. At that point, the waiting transaction is woken up and the latch is granted (line 915).

Accessing Pages Using the Committed_LSNs 36,38a,38b

Figure 6:
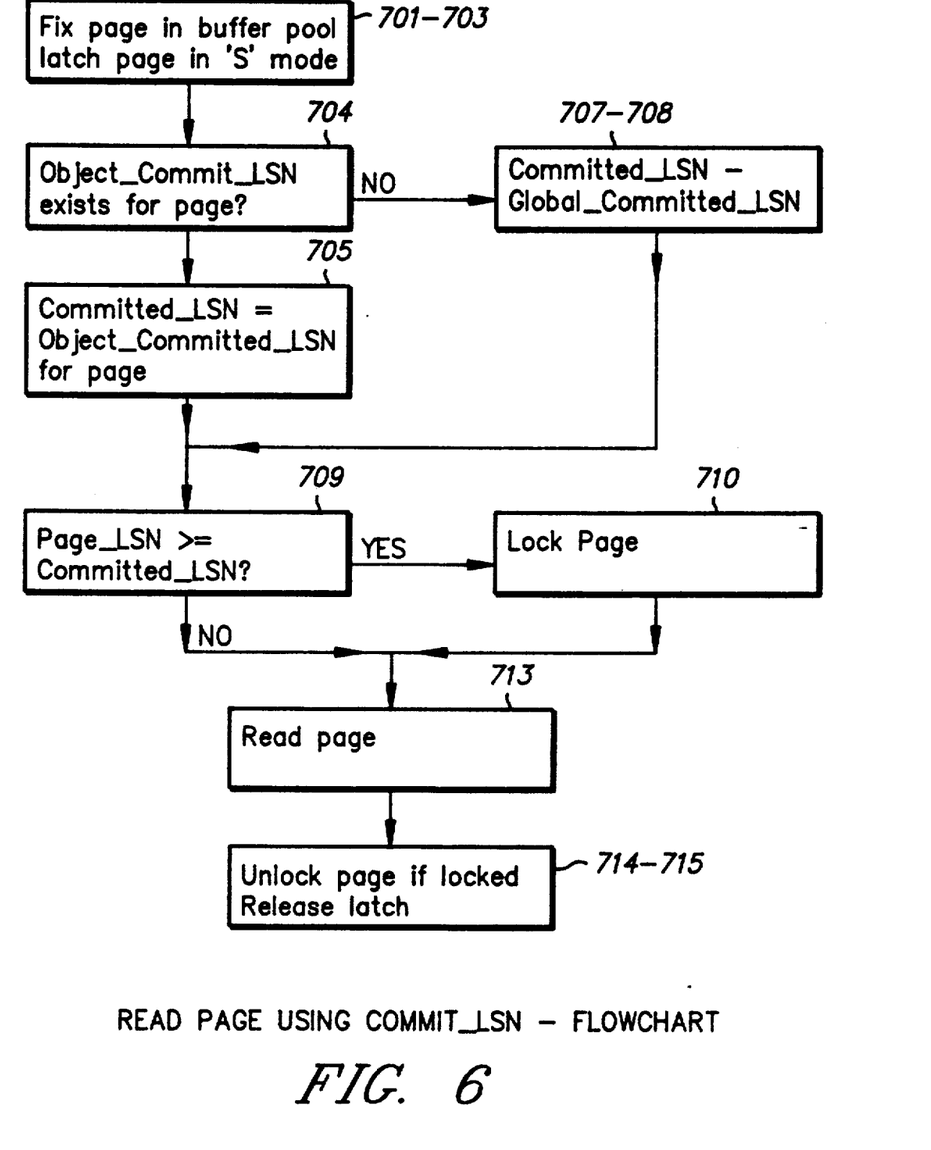
FIG. 6 is a flowchart of the preferred method for accessing a page using a Committed_LSN.
Figure 7:
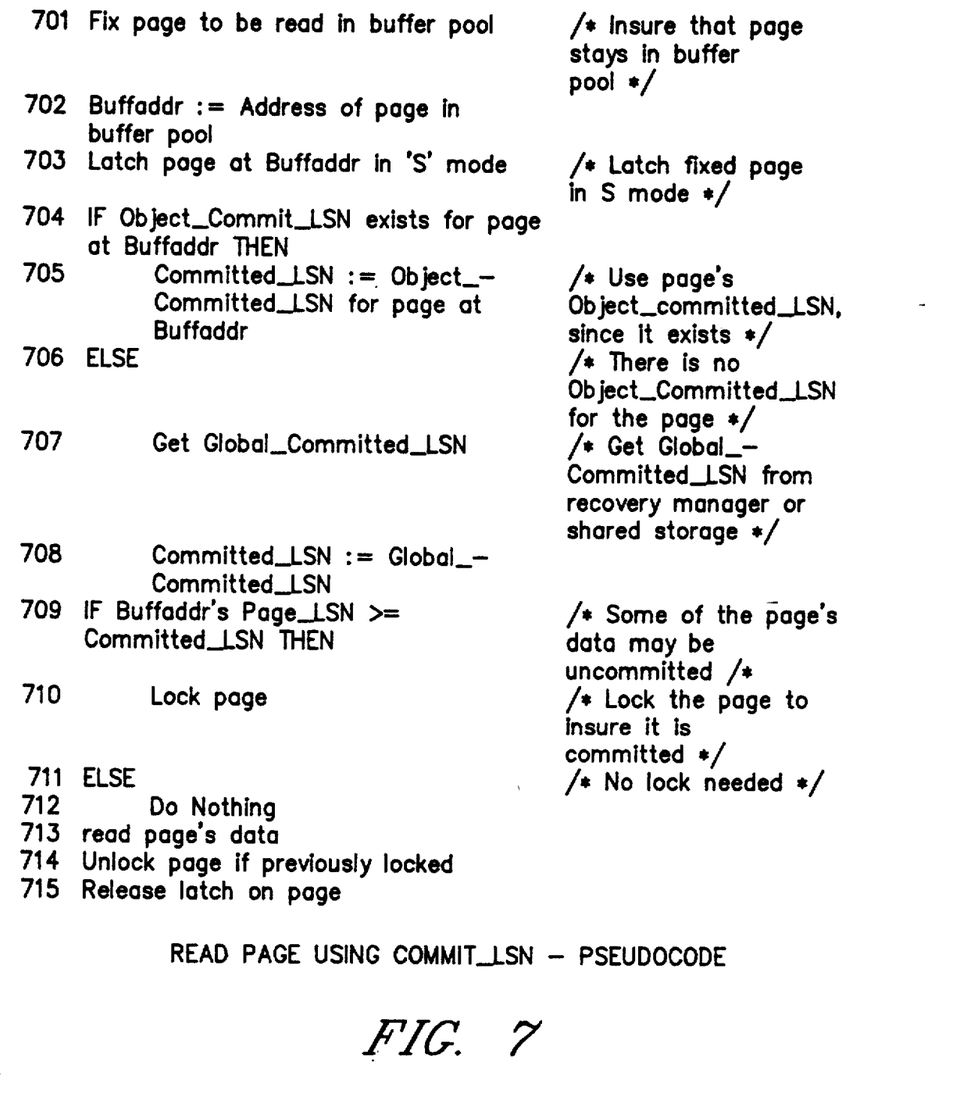
FIG. 7 is pseudocode corresponding to the flowchart of FIG. 6.

The preferred method for accessing data pages 33 using the Committed_LSNs 36,38a,38b of this invention is shown in FIGS. 6 and 7. First, the page to be read must be fixed in the buffer pool (line 701), so that it cannot be moved while the transaction is preparing to read it. The page's address in the buffer pool is stored (line 702), and the page is latched in shared 'S' mode (line 703).

If an Object_Committed_LSN 38a, 38b exists for the page (line 704), then it is used as the Committed_LSN (line 705) to be compared to the page's Page_LSN. Otherwise, the Global_Committed_LSN 36 is used.(lines 706-707).

If the page's Page_LSN is greater (i.e., younger) than or equal to the Committed_LSN used in the comparison (line 709), then some of the page's data may be uncommitted and the page must be locked (line 710). Otherwise no lock is needed (lines 711-712).

The page is then read (line 713), unlocked if necessary (line 714) and the latch is released (line 715).

EXAMPLE

Figure 10:
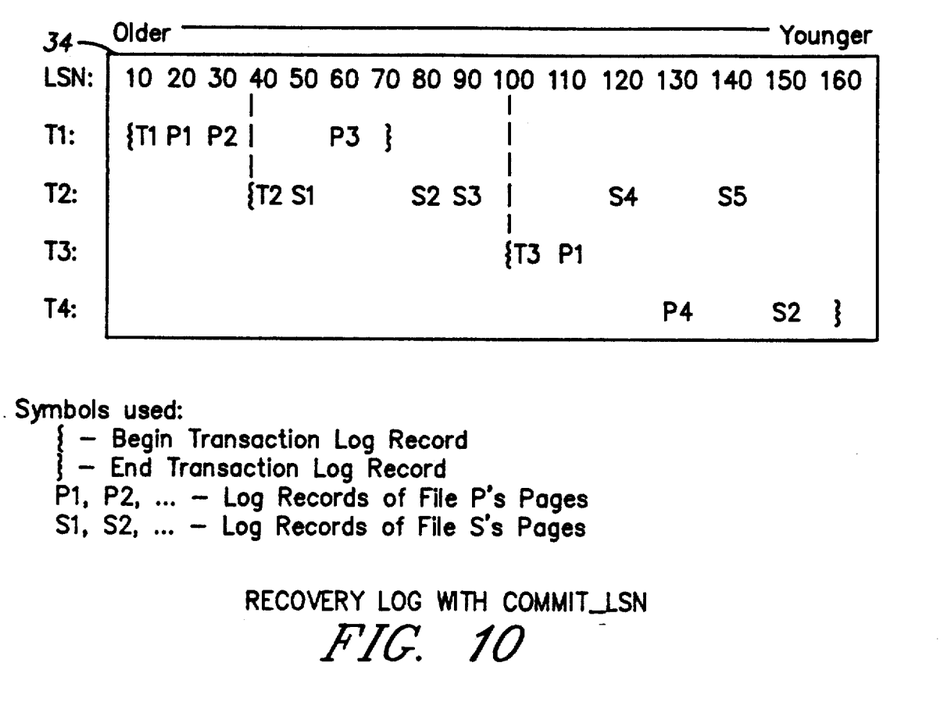
FIG. 10 shows an example recovery log with a Global_Committed_LSN and Object_Committed_LSNs according to the invention.
Figure 11:
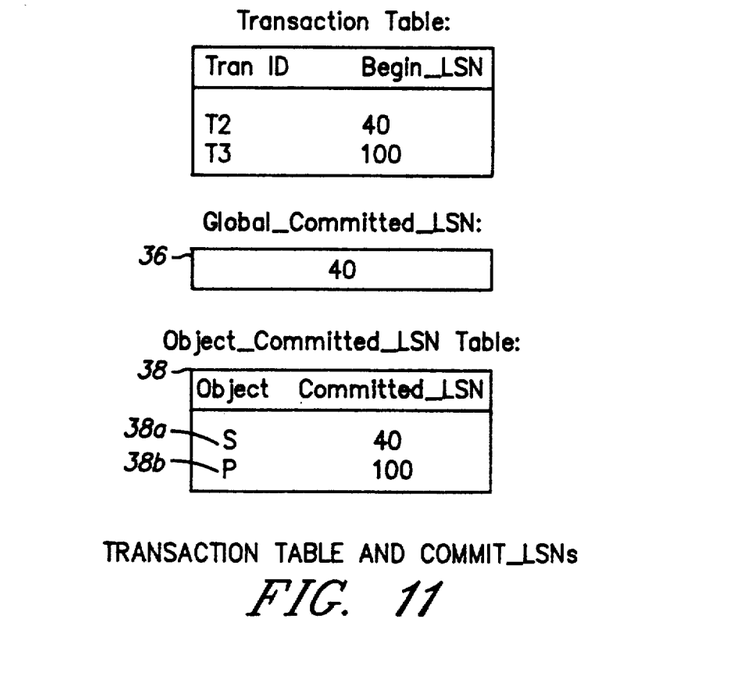
FIG. 11 shows an example transaction table and Committed_LSNs.

An example of recovery log 34, a Global_Committed_LSN 36, and Object_-Committed_LSNs 38a, 38b are shown in FIG. 10, while FIG. 11 shows an example transaction table. The values shown in these examples correspond to the values shown in the system diagram of FIG. 1.

The example shows two data objects such as files, identified as P and S, and having pages P1-P4 and S1-S4, respectively, in the buffer pool 32.

The example shows the state of the system 20 at the time when the End_of_Log_LSN of the recovery log 34 is equal to 160. At that time, update transactions T2 and T3 remain active, while the updates of transactions T1 and T4 have been committed.

Transaction T1 updated page P1 at time LSN 20, page P2 at LSN 30, and page P3 at LSN 60. These updates were logged to the recovery log 34, and the updates' LSNs were stored as the page's Page_LSN 35 in the buffer pool 32. Transaction T1 committed and was terminated at LSN 70.

Transaction T2 began at LSN 40, updated page S1 at LSN 50, and continues to run as of the current LSN 160. Because this transaction T2 is the oldest still uncommitted transaction, the Global_Committed_LSN 36 for the system at this moment is equal to the Begin_LSN of transaction T2, which is 40. Transaction T2's update to page S1 at LSN 50 is reflected in page S1's Page LSN. However, transaction T2's update to page S2 at LSN 80 has been superseded by transaction T4's update to page S2 at LSN 150, so that page S2's Page_LSN is equal to 150. Transaction T2's updates to pages S3 and S4 are reflected in those pages' Page_LSNs of 90 and 120, respectively. Transaction T2's update to page S5 was logged at LSN 140.

The Object_Committed_LSN 38a, 38b for data object S is determined by the oldest still uncommitted transaction updating object S, in this case transaction T2. Transaction T3, updating data object P, similarly determines the Object_Committed_-LSN 38a, 38b for that object, which in this example is equal to 100, the Begin_LSN of transaction T3, since as of the current End_of_Log_LSN 160 transaction T3 is not yet committed.

Transaction T4, which updated pages P4 and S2, committed at LSN 160. Its update of page S2, which occurred after transaction T2's update to that page, determines the Page_LSN of page S2, shown here as 150.

The transaction IDs and Begin_LSNs of all still-uncommitted transactions, here T2 and T3, is shown in FIG. 11. FIG. 11 also shows the system's Global_Committed_LSN 36, which is equal to LSN 40, and the system's Object_Committed_LSN table 38a, 38b. As shown in FIG. 1, these tables are stored in computer memory 30, and are preferably maintained by the system's recovery manager.

In multisystem transaction processing systems, data can be shared between the individual database management systems (this is call a data sharing or DS system), or data can be partitioned between the systems (known as a non-data sharing or NDS system). In data sharing systems, the disks are shared by the multiple instances of the data base management system (DBMS), but each DBMS instance has its own buffer pool and global locks, and buffer coherency protocols are required to preserve consistency of the data, in spite of the ability of all the systems to read and modify any of the data in the data base. In non-data sharing systems, each system can read or modify directly only a portion of the data in the data base.

Non-data sharing (NDS) systems stand to benefit greatly from this invention since there is only, at most, one copy of the data in the buffer pool with NDS. The Committed_LSN 36, 38a, 38b can be determined by each system independently of the other systems.

In data sharing (DS) systems, conceptually each system needs to periodically poll the other systems to determine the minimum Committed_LSN across all the systems (various alternatives are possible for implementing this efficiently). However it is acceptable to use an out of date Committed_LSN. At worst this can only cause unnecessary locking—uncommitted data will never be read. In DS, since there can be more than one copy of each page in the different buffer pools, unless a given system is already known to have the latest version of a given page, the utility of the invention is reduced. DS is penalized the most when page locking is done compared to NDS, but it is still better compared to DS in which the current invention is not adopted.

It will be appreciated that, although specific embodiments of the invention have been described herein for purposes of illustration, various modifications may be made without departing from the spirit and scope of the invention. In particular, in maintaining a Global_Committed_LSN it may be more cost effective to compute it only when it is needed, if it is not needed very often. Various possibilities exist for implementing the continuous tracking of Global_Committed_LSN. The recovery manager could use a priority queue to keep track of the Begin_LSNs of the currently active update transactions. Alternatively, the recovery manager could compute the Global_Committed_LSN at regular intervals based on elapsed time, number of update transaction terminations, amount of logging, etc.

An alternative method of maintaining the Object_Committed_LSN is to track, for each transaction and for each object that it updates, a lower bound on the LSN of the log record of the first update that the transaction makes to that object. This information can be kept in the virtual storage descriptor information associated with the object. A transaction needing the Object_Committed_LSN can then use the minimum of the tracked LSN values and the End_of_Log_LSN as the Committed_LSN. The Committed_LSN computed in this fashion will be greater than or equal to the value derived from the preferred embodiment described above.

This invention can also be extended to work in transaction systems which do not log changes to all the pages of the data base and which do not store the Page_LSN in the page header. In such systems, we require the systems to keep track of the youngest transaction to have updated each page and use this information in the same fashion as the Page_LSN in the comparison with the Global_Committed_LSN or Object_Committed_LSN described above to reduce or avoid locking.

This invention is not only useful in page-locking transaction processing systems, but is equally useful (or may even be more so) where lower-granularity locking is used, such as in record-level locking systems. And the invention is also useful in systems which do not use write-ahead logging, such as systems which use shadow paging and logging.

Accordingly, the scope of protection of this invention is limited only by the following claims and their equivalents.

I claim:

1. In a computerized data processing system having a plurality of data units, each data unit being identified by a respective first identifier which reflects an age not older than the age of the youngest modification of the data unit, a method of accessing a selected one of the data units by a selected one of a plurality of processes comprising the steps performed by the data processing system of:

(a) maintaining a second identifier which reflects an age at least as old as the then-oldest in-process modification of a first plurality of the plurality of data units;

(b) comparing the second identifier with the selected data unit's respective first identifier;

(c) obtaining access to the data unit for the selected process compatibly with other process' accesses to the data unit, said step of obtaining access being performed using fewer computer instructions if the selected data unit's respective first identifier is older than the second identifier than if the selected data unit's respective first identifier is not older than the second identifier; and (d) reading the data unit by the selected process.

2. The method of claim 1, wherein the step of maintaining a second identifier includes identifying the then-oldest in-process modification taking place on any of the plurality of data units.

3. The method of claim 1 wherein the step of maintaining a second identifier includes identifying the then-oldest in-process modification taking place on any of a subset of the plurality of data units, the subset including the selected data unit and including one of (i) all of the plurality of data units which are files, (ii) all of the plurality of data units which are tables, and (iii) all of the plurality of data units which are indexes.

4. The method of claim 1, wherein the step (c) of obtaining access comprises latching the data unit if the selected data unit's respective first identifier is older than the second identifier, and locking the data unit if the selected data unit's respective first identifier is not older than the second identifier, wherein said step of latching includes fewer computer instructions than said step of locking.

5. The method of claim 1, wherein the data units comprise data pages.

6. The method of claim 1, wherein the data units comprise data records, multiple such records being included in a single data page.

7. The method of claim 1, wherein a process for modifying the selected data units includes making a plurality of modifications, and the process responsive to the step of obtaining access, either performs all of the plurality of modifications or performs no modifications.

8. The method of claim 7, wherein the second identifier is updated in response to every modifying process.

9. A data processing system comprising:

a plurality of data units, each data unit being identified by a first respective identifier means which reflects an age not older than the age of the youngest modification of the data unit;

means for reading a selected one of the plurality of data units to which access has been obtained;

means for maintaining a second identifier which reflects an age at least as old as the then-oldest in-process modification of a first plurality of the plurality of data units;

means for comparing the second identifier with the selected data unit's respective first identifier means; and means for obtaining access to the selected data unit for the selected process compatibly with other process' accesses to the selected data unit, said access obtaining means comprising fewer computer instruct if the selected data unit's respective first identifier is older than the second identifier than if the selected data unit's respective first identifier is not older than the second identifier.

10. The system of claim 9, wherein the access obtaining means comprises computer instructions for latching the selected data unit if the selected data unit's identifier is older than the second identifier, and computer instructions for locking the selected data unit if the selected data unit's identifier is not older than the second identifier, said latching computer instructions being fewer than said locking computer instructions.

11. A method for accessing a selected one of a plurality of data units, maintained on a data processing system, by a selected one of a plurality of processes, the method comprising the steps of:

maintaining, for each respective one of the plurality of data units, a first identifier which identifies a most recent time at which the respective data unit was modified;

maintaining a second identifier which identifies a time of commencement of an oldest in-progress modification of any one of a first plurality of the plurality of data units, the first plurality of data units including the selected one of the plurality of data units;

comparing the second identifier with the first identifier of the selected one of the plurality of data units to determine whether the most recent modification of the selected data unit occurred prior to the commencement of the oldest in-progress modification of any one of the first plurality of data units;

accessing the selected one of the plurality of data units according to a first set of computer instructions if the step of comparing determines that the most recent modification of the selected data unit occurred prior to the commencement of the oldest in-progress modification of any one of the first plurality of data units; and accessing the selected one of the plurality of data units according to a second set of computer instructions otherwise.

12. The method of claim 11, wherein:

other ones of the plurality of processes may concurrently require access to the selected one of the plurality of data units;

any one of the plurality of processes which accesses one of the plurality of data units does so according to one of a plurality of modes, certain ones of the modes being mutually compatible for concurrent access, certain other ones of the modes being mutually incompatible for concurrent access and requiring consecutive access; and the steps of accessing each include (a) accessing concurrently with at least one other process if each of the at least one other process and the selected process access according to mutually compatible modes, and (b) accessing after at least one other process, currently accessing, is completed, if the selected process accesses according to a mode mutually incompatible with a mode according to which at least one other process is currently accessing the data unit.

13. A method as recited in claim 11 wherein the step of maintaining includes maintaining a second identifier which identifies a time of commencement of an oldest in-process modification of any of the plurality of data units.

14. A method as recited in claim 11 wherein the step of maintaining includes maintaining a second identifier which identifies a time of commencement of an oldest in-process modification of the first plurality of data units, the first plurality including one of (i) all of the plurality of data units which are files, (ii) all of the plurality of data units which are tables, and (iii) all of the plurality of data units which are indexes.

15. A system as recited in claim 9, wherein the means for maintaining a second identifier includes means for maintaining a second identifier which reflects an age at least as old as the then-oldest in-process modification of any of the plurality of data units.

16. A system as recited in claim 9, wherein the means for maintaining a second identifier includes means for maintaining a second identifier which reflects an age at least as old as the then-oldest in-process modification of the first plurality of data units, the first plurality including one of (i) all of the plurality of data units which are files, (ii) all of the plurality of data units which are tables, and (iii) all of the plurality of data units which are indexes.

* * * * *